United States Patent [19]
Konrad

[11] 3,914,675
[45] Oct. 21, 1975

[54] FAULT DETECTOR CIRCUIT FOR ELECTRIC VEHICLE CONTROL

[75] Inventor: Charles Edward Konrad, Roanoke, Va.

[73] Assignee: General Electric Company, Salem, Va.

[22] Filed: Sept. 17, 1973

[21] Appl. No.: 397,984

[52] U.S. Cl. ............... 318/453; 318/139; 318/455; 317/13 R
[51] Int. Cl.² .......................................... H02P 5/16
[58] Field of Search .......... 318/453, 454, 452, 455, 318/139; 317/13 R, 13 A, 22

[56] References Cited
UNITED STATES PATENTS

| | | | |
|---|---|---|---|
| 3,283,236 | 11/1966 | Legg | 318/452 X |
| 3,349,309 | 10/1967 | Dannetell | 318/139 X |
| 3,544,845 | 12/1970 | Spyrou | 317/22 |
| 3,602,771 | 8/1971 | Walstad | 317/22 X |
| 3,643,151 | 2/1972 | Matsushima | 317/22 X |
| 3,660,718 | 5/1972 | Pinackers | 318/454 X |
| 3,818,291 | 6/1974 | Miyake | 318/139 |

*Primary Examiner*—B. Dobeck
*Attorney, Agent, or Firm*—W. C. Bernkopf; J. H. Beusse

[57] ABSTRACT

A fault detector circuit for an electric vehicle control. The circuit is coupled to a power switching device for connecting a load, such as traction motor, to a source of DC voltage. When the conductivity of the power switching device remains high for an unduly long period of time the circuit produces a signal for disabling the control. If the switching device returns to a non-conductive condition within a subsequent predetermined period of time, the disabling signal ceases and a reset circuit is activated, causing it to change state. Should the switching device remain conductive for an undue period for a second time, a disable signal is again produced but the reset circuit, now in its changed state, renders it impossible to discontinue the disabling signal.

17 Claims, 2 Drawing Figures

3,914,675

FAULT DETECTOR CIRCUIT FOR ELECTRIC VEHICLE CONTROL

BACKGROUND OF THE INVENTION

The present invention relates to pulse control circuits and, more particularly, to DC chopper circuits of the type used in electric vehicles. In the past, several methods have been utilized in monitoring the activity of an electric vehicle control of the chopper type. In one approach the voltage drop across the power switching element, which is commonly a silicon controlled rectifier, or SCR, is monitored during operation. A large voltage drop indicates the nonconductance of the SCR, while a very low voltage drop is taken to indicate the conduction thereof. It is apparent, therefore, that a shorted or otherwise failed SCR cannot be detected until the main contactors of the system are closed, and power is applied to the power switching circuit. It is then necessary to wait a predetermined period to see if the SCR is extinguished, or commutated. If not, the system then begins to disable the main power circuit, which requires a relatively long period of time. In the interim, the SCR not being commutated, full current flows through the load (in the case of an electric vehicle, the traction motor) and the vehicle undergoes maximum acceleration until the system is finally disabled.

Accentuating this problem is the fact that in many control systems of the chopper type current flow through the load is controlled by modulating the on-time or pulse width of the power switching element. Ordinarily, to accelerate the vehicle from rest a short pulse time of approximately one millisecond is used in order to limit current peaks in the absence of motor back emf. However at high speed, when a motor has built up considerable back emf, a relatively long on-time can be used to supply current; on-times of approximately 50 milliseconds are common. Prior art fault detectors must then be capable of waiting at least 50 milliseconds before disabling the main power system of the vehicle — a very long time for an SCR to remain conductive when the vehicle is starting from rest. Further, the natural decay time due to the inductive characteristics of the contactor coils energizing the main circuit contactors is often in the neighborhood of 50 milliseconds. The effect is to produce a violent lurch when a vehicle having a shorted SCR or, equivalently, welded bypass contactor tips, is started.

Another approach to fault detection is to monitor load voltage. One example of this approach is disclosed in U.S. Pat. No. 3,363,160-Morris. However, it is again necessary that the power circuit be energized before the fault detection system can come into play. In addition, when using a gated thyristor it is usually considered more convenient and economical to monitor the voltage drop across the thyristor since the drop is substantially smaller than the voltage which arises across the traction motor. The circuitry used may thus be adapted to work at a much lower voltage, and transformation of a relatively high voltage for use with signal-level components is unnecessary.

A further deficiency in the prior-art systems is the fact that fault detectors generally disabled a vehicle control circuit upon the detection of a single missed commutation cycle. A single omitted commutation can occur due to a transient voltage spike arising in the commutation circuit, or due to a stickly contact which unduly delays the opening of a bypass contactor. After being shut down in response to these phenomena the vehicle control must then be manually reset. Although, statistically speaking, such aberrant events occur only rarely since the system pulses millions of times in a day's operation, unnecessary disablement may occur often enough to become an impediment to the practical operation of the vehicle. Hence, it will be appreciated that it would be desirable to provide a fault detection system which obviates the above-mentioned difficulties.

It is therefore an object of the present invention to provide a fault detector which is not tripped by the presence of a single, transient voltage.

It is another object of the invention to provide a fault detector which monitors the integrity of the switched elements of a pulse control system before the energization thereof.

It is another object of the invention to provide a fault detector system for an electric vehicle which does not require continuous re-setting caused by false tripping due to transient voltages.

SUMMARY OF THE INVENTION

Briefly stated, in accordance with one aspect of the invention the foregoing objects are achieved by providing a bistable means coupled to a power switching device, the state of the output of the bistable means depending upon the conductivity of the device. Disabling means coupled to the bistable means operate to remove power from the system when the bistable means changes state. Time delay means coupled to the output of the bistable means serves to cause the state of a reset means to change after a predetermined time. If the power switching device returns to a normal status before the time delay means times out, the system returns to normal with the exception of the reset means, which remains in its changed state. The reset means does not again attain its original state until the entire fault detector system has deenergized.

If the power switching device again remains conductive for an overly long period, the bistable means is again activated and outputs a signal for disabling the system. This time, however, due to the changed status of the reset means the bistable means remains activated and the control system remains disabled until it is manually reset.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF THE PREFERRED EMBODIMENT

Figure 1:
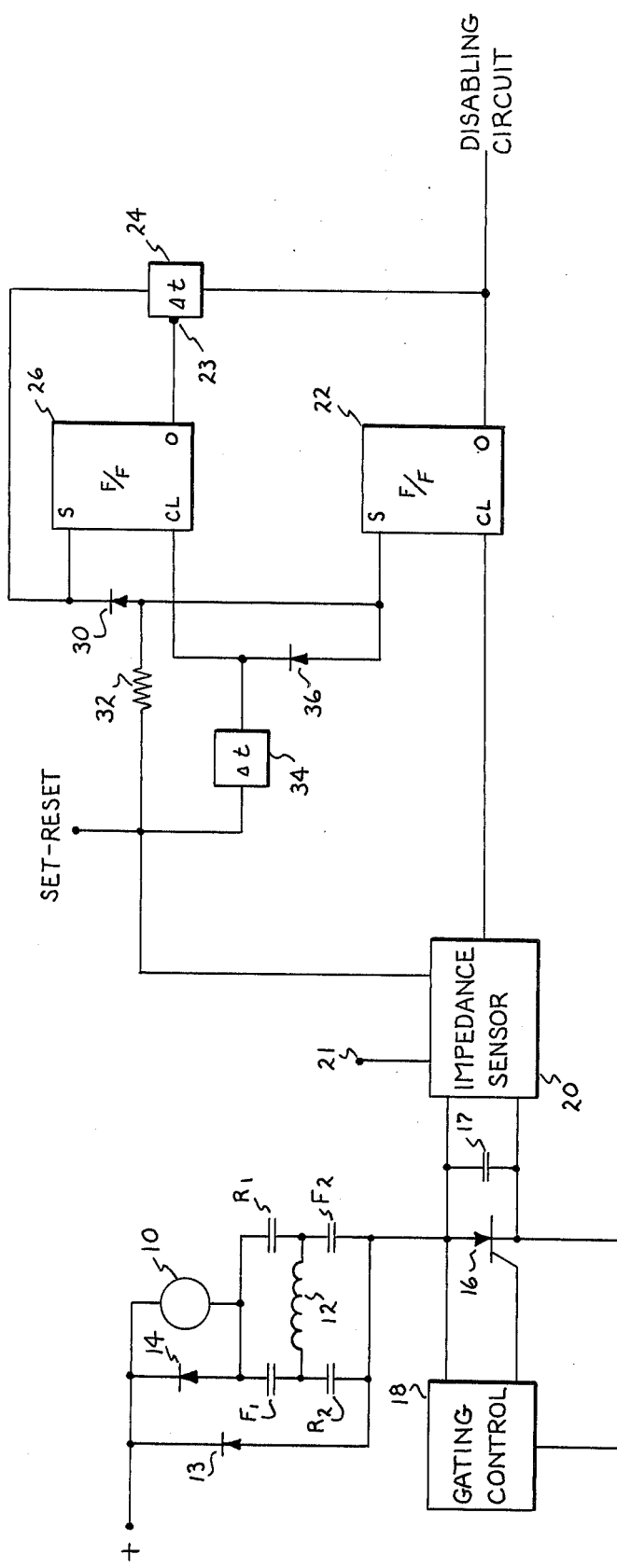
FIG. 1 is an idealized schematic diagram illustrating the operation of the invented system.

Referring now to FIG. 1, there is shown in simplified form an armature 10 and series field 12 of a DC traction motor. A set of four contactors $F_1$, $F_2$, $R_1$ and $R_2$ are connected about field winding 12 in a manner familiar to those skilled in the art and may be selectively energized for coupling the field winding to armature 10 to achieve forward or reverse rotation. A flyback diode 13 serves to maintain the flow of current to the armature 10 and field 12 during interpulse periods, and a plugging diode 14 coupled about armature 10 provides a path for current flow when the motor is operating in the braking mode. A power switching device 16, herein shown as a gated thyristor or more particularly an SCR, is coupled in series between the motor and a source of DC voltage (not shown). An electromechanical bypass contactor 17 is coupled in shunt about the SCR. A gating control 18 serves to apportion the conductive to non-conductive intervals of SCR 16 for controlling the time-averaged or effective voltage which arises across the terminals of the motor.

An impedance sensor 20 is coupled across SCR 16 and outputs a signal which reflects the conductive status of SCR 16. Input terminal 21 receives a signal for preventing impedance sensor 20 from outputting a spurious fault signal when contactor 17 has intentionally been closed. Impedance sensor 20 is coupled to the "clear" input CL of bistable means 22, shown here as a flip flop of the zero set, zero clear type which operates in a manner well known to those skilled in the art. Output terminal 0 of flip flop 22 is coupled to a first time delay 24 and to a disabling stage (not shown). The output of time delay 24 is applied directly to set terminal S of a reset means, shown as another zero set, zero clear flip flop 26, and through a diode 30 to the set terminal S of the "disable" flip flop 22. The output terminal 0 of reset flip flop 26 is coupled to an inhibit terminal 23 of time delay 24.

Voltage from a set-reset voltage source (not shown) is also applied to the set terminals of flip flops 22 and 26 by means of a resistor 32 and to clear terminal Cl of reset flip flop 26 by way of a second time delay 34. Another diode 36 is coupled between the output of time delay 34 and the set terminal of flip flop 22.

The operation of the illustrated circuit will now be described, making reference to the above-enumerated elements. Upon initial energization of the vehicle drive system, energy is supplied to impedance sensor 20, flip flops 22 and 26, and time delay circuit 34. The control circuits of most electric vehicles are arranged so that initial energization can only take place when a directional control is in an intermediate or neutral position, i.e. forward contactors $F_1$ and $F_2$ and reverse contactors $R_1$ and $R_2$ are all open so that current cannot flow through the motor windings. Although power is not applied to SCR 16 or to bypass contactor 17, the system nonetheless monitors their status. If thyristor 16 is short circuited due to an internal failure or if the contacts of bypass contactor 17 are welded shut or otherwise stuck in a closed position, impedance sensor 20 produces a fault signal which is applied to clear terminal Cl of flip flop 22. In response to the received signal, the flip flop 22 produces a disable signal which is applied to a disabling stage which may, for example, comprise a relay whose contacts are in series with the main power source of the system.

At the same time, the disable signal produced by flip flop 22 is applied to time delay 24. After a predetermined time has elapsed, time delay 24 applies a reset signal simultaneously to set terminals S of reset flip flop 26 and flip flop 22. Reset flip flop 26 now changes state, and outputs a signal to Inhibit terminal 23 of time delay 24 which prevents further operation thereof.

If in the interval required for time delay 24 to operate the fault detected by impedance sensor 20 has ceased, indicating a transient and thus a non-serious fault, the application of an output signal from time delay 24 to set terminal S of flip flop 22 will cause the output thereof to revert to its original state. The disabling mechanism is deenergized and power is again made available to the motor. If, however, the fault sensed by impedance sensor 20 persists, the reset signal applied to terminal S of the disable flip flop 22 will be ineffective to change the output state of the flip flop. Such a continued state of high conductivity would reflect, for instance, the failure or short circuiting of thyristor 16, or the welding shut of contactor 17.

Should the status of SCR 16 and bypass contactor 17 be correct upon initial energization of the control system, no fault signal will be produced by impedance sensor 20. Forward contactors $F_1$, $F_2$ or reverse contactors $R_1$, $R_2$ may then be selectively operated to complete the motor drive circuit. As will be understood by those skilled in the art, gating control 18 sequentially gates SCR 16 into conduction, then commutates it to provide pulses of voltage to the motor. As set forth above the average voltage appearing across the motor is determined by the ratio of on-time to off-time of SCR 16, this ratio being termed the mark-space ratio. For any given system, the maximum continuous on-time of the SCR is known and impedance sensor 20 is adjusted to produce a fault signal only when maximum on-time is exceeded.

Occasionally, gating control 18 will fail to commutate the SCR. Occasional, isolated failures of this nature, though they may result in a doubled on-time for the SCR, are not necessarily detrimental to the thyristor. Such spurious commutation failures may arise due to transient voltages appearing in the system which are caused by outside agencies or unusual operating conditions. Nonetheless, the fault detector system must be sensitive enough to detect commutation failures rapidly in order to disable the system in time to prevent the SCR from being destroyed.

Although spurious commutation failures are, statistically speaking, relatively rare they occur with sufficient frequency so that sensitive fault detector systems are occasionally tripped, rendering the control systems inoperable until manually reset. The resetting operation can be relatively time-consuming and, in any event, removes equipment from service until it can be determined whether the fault was actual or spurious.

The present system provides a redundant or "try again" function which does not require manual resetting until at least two commutation failures have been detected. When a first commutation failure is detected, as evinced by a lowered impedance of SCR 16 which persists beyond the maximum anticipated on-time, impedance sensor 20 produces a fault signal which causes flip flop 22 to change state and apply a disable signal to the disabling stage. As before, during a predetermined period of time time delay 24 will apply a reset signal to flip flops 26 and 22. If a single, transient commutation failure has been experienced the impedance of SCR 16 will by then have risen to a relatively high value, effecting a cessation of the fault signal and causing flip flop 22 to reattain its normal state. Reset flip flop 26, however, will remain in its reset state for the remainder of the period during which the overall system is energized. Now, should another "transient" fault be detected during the operation of the vehicle, such as another failure to commutate thyristor 16, the reset system will be unable to set disabling flip flop 22 back to its original state.

In such an instance, the impedance sensor 20 will again apply a fault signal to the clear terminal Cl of flip flop 22. In response thereto, a disable signal will be transmitted from the flip flop to the disabling stage, and, at the same time to the input terminal of time delay 24. However, due to the changed state of the reset flip flop 26 time delay 24 is inoperative to supply signals to the set terminals of flip flops 22 and 26. In this case, even should the fault detected by impedance sensor 20 have ceased, flip flop 22 will continue to produce a disable signal and the vehicle will remain shut down until it is manually reset. This activity may be referred to as a try again feature in that it is anticipated that a transient fault will be detected from time to time, but that the likelihood of repeated transient faults during any given period of operation is so small that repeated detected faults indicate a defect in the system.

However, to properly reset flip flops 22 and 26 it is necessary that the re-energizing signals be applied in a predetermined sequence. Time delay means 34 serves to provide the necessary sequencing or steering of the signals, applying a signal to the Clear terminal of flip-flop 26 subsequent to the application of signals to the Set terminals of both flip flops 22 and 26.

Figure 2:
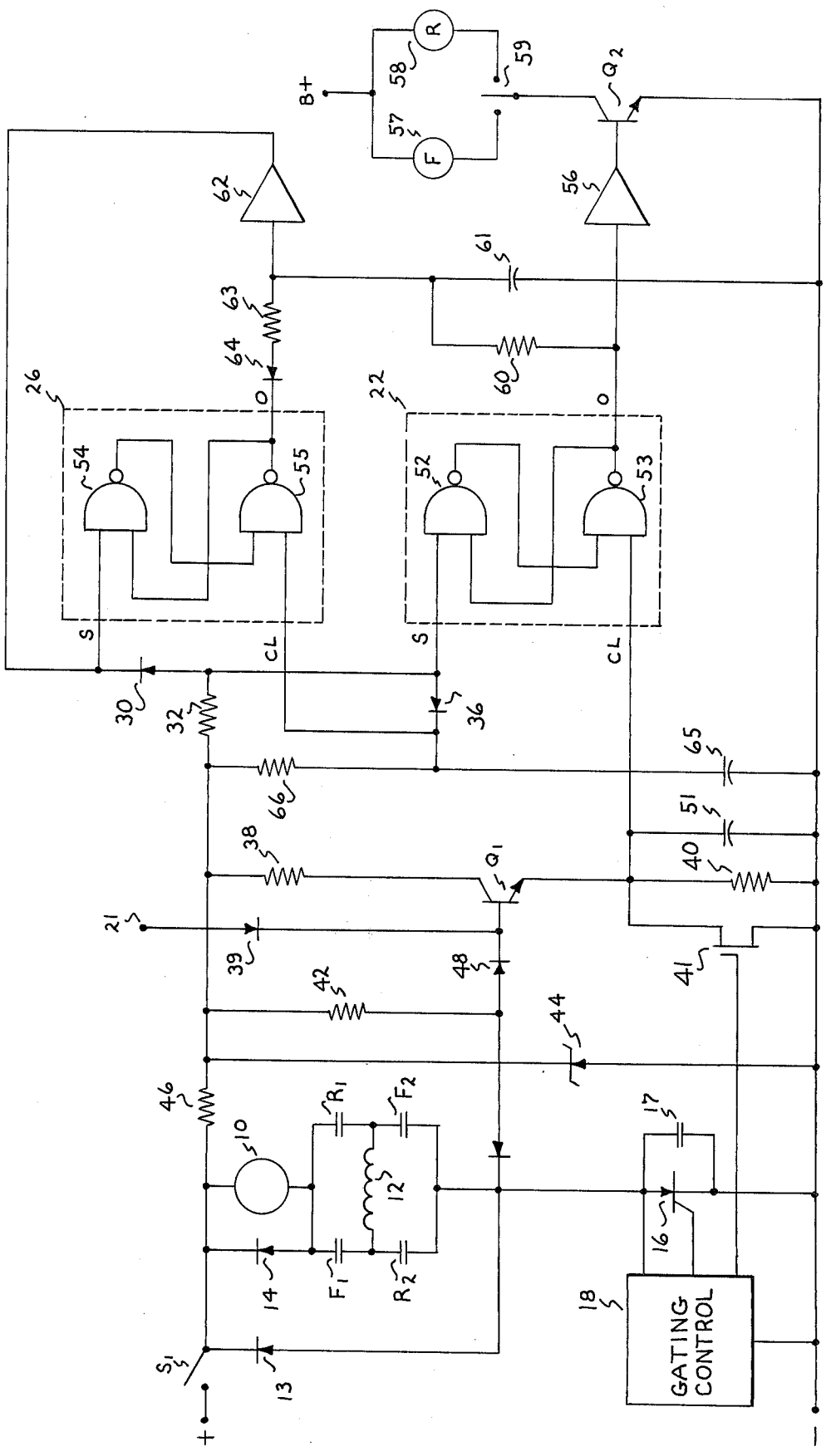
FIG. 2 is a schematic diagram of a logical circuit useful in practicing the present invention.

FIG. 2 shows in detailed form a logic circuit suitable for carrying out the present invention. An impedance sensor stage includes a transistor $Q_1$ whose emitter-collector circuit is coupled across a source of supply voltage by resistors 38 and 40. A suitable bias is applied to the base of $Q_1$ by way of resistor 42, and the combination of a zener diode 44 and dropping resistor 46 serve to provide a suitable biasing potential for the fault detector circuitry. The base terminal of transistor $Q_1$ is coupled to one side of power switching means comprising a thyristor 16 and bypass contactor 17, and forms the input terminal for that portion of the circuit analogous to impedance sensor 20 of FIG. 1. Diodes 48 and 50 serve to isolate the voltage levels of transistor $Q_1$ and the motor power circuit, yet allow current to flow through resistor 42 to the circuit branch of least impedance. Current flowing from the emitter of transistor $Q_1$ encounters an RC circuit comprising resistor 40 and capacitor 51. This RC circuit functions as a time delay, the time required for a fault signal voltage to accrue across capacitor 51 being somewhat greater than the maximum anticipated on-time of SCR 16.

The time constant of the RC circuit may be changed to reflect different anticipated on-times by means of a FET 41 coupled to shunt with resistor 40. A signal suitable for controlling FET 41 may be obtained from gating control 18. A diode 39 couples the base of transistor $Q_1$ by way of terminal 21 to an interlock circuit (not shown) which supplies current to $Q_1$ when bypass contactor 17 is closed to prevent the generation of a spurious "fault" signal.

As will be recognized by those skilled in the art, a flip-flop 22 of the characteristics heretofore described can advantageously be formed from a pair of NAND gates 52 and 53. As is well known, a NAND gate is a logical element which responds to the simultaneous presence at all of its input terminals of signals corresponding to logical 1's by outputting a signal corresponding to a logical 0. The NAND gate responds to any other combination of logic signals applied to its input terminals by outputting a signal representing a logical 1.

A similar combination of NAND gates 54 and 55 are coupled together to form reset flip flop 26. It will be recognized that the output terminals of each NAND gate of each flip flop are coupled to one input terminal of the other; one input terminal of the upper NAND gate forms a clear or CL terminal, and the remaining input terminal of the lower NAND gate forms a set or S terminal. The output terminal 0 of the resulting flip flop is the output terminal of the NAND gate whose input is designated the clear or CL terminal.

The output signal from disable flip flop 22 is applied through an inverting amplifier 56 to a switching element such as transistor $Q_2$ which is coupled in series relationship with forward and reverse contactor coils 57 and 58. Coil 57, when energized, effects the closing of contacts $F_1$ and $F_2$ while coil 58 controls contacts $R_1$, $R_2$. As is known to those skilled in the art, in electric vehicles a selector switch 59 is provided for selectively energizing the appropriate contactor coil to closing the desired set of contacts.

The output signal from disable flip flop 22 is also applied to a time delay circuit comprising a resistor 60 and capacitor 61. The intersection of the resistor and capacitor are coupled through an inverting amplifier 62 to the set terminal S of reset flip flop 26 and, by way of resistor 63 and isolating diode 64, to the output terminal of a flip flop 26. A set-reset signal, here the bias voltage arising across zener diode 44, is accrued upon capacitor 65 by way of resistor 66. The voltage upon capacitor 65 is applied to terminal C of reset flip flop 26.

When an energizing voltage is first applied to the vehicle drive system through a master switch $S_1$, direction selector 59 normally must be in an open or neutral position. This arrangement is provided so that the vehicle will not immediately begin accelerating in either a forward or reverse direction as soon as power is turned on. Therefore, no current flows through either forward coil 57 or reverse coil 58 so that neither the forward contactors $F_1$, $F_2$ nor reverse contactors $R_1$, $R_2$ are closed. Nonetheless, despite the disconnection of the traction motor, an energizing potential is present at the fault detector circuit. Further, an appropriate biasing voltage is applied to the base of transistor $Q_2$ to enable current to flow through the selected relay coil upon engagement of directional switch 59. At this point in time, gating control 18 is inoperative, and both thyristor 16 and bypass contactor 17 should be deenergized and therefore nonconducting.

Although no power is applied to the motor through the power switching means 16 and 17, the supply voltage for the fault detector system is applied to these switching elements through diode 50. Under normal conditions the conductivity of the switching elements will be relatively low, that is, contactor 17 should be open and thyristor 16 should be disabled and therefore nonconductive. In this instance, the voltage which appears at the base terminal of transistor $Q_1$ will be relatively high and will forward bias diode 48. Current then flows through diode 48 and energizes transistor $Q_1$ after some period of time. The current now allowed to flow through transistor $Q_1$ causes a voltage to arise across resistor 40 and capacitor 51 which is substantially higher than a common or referencee voltage. This voltage will be treated as a signal corresponding to a logical 1. At the time switch $S_1$ is closed a supply voltage, also representative of a logical 1 signal, is applied by way of resistor 32 to the set or S terminals of flip flops 22 and 26. An output signal of a relatively low magnitude, referred to hereinafter as a logic 0, is thus caused to be present at output terminal 0 of flip flop 22. The logical 0 causes inverter 56 to energize transistor $Q_2$, making power available to switch 59 and thus to contactor coils 57 or 58.

After contactors $F_1$, $F_2$ or $R_1$, $R_2$ are closed and thyristor 16 is conducting intermittently to provide pulse-controlled DC power to the motor, capacitor 51 operates in conjunction with resistor 40 to maintain the logical 1 signal at the input terminal of flip flop 22 during normal interpulse periods. The values of resistor 40 and capacitor 51 are selected to provide a time constant which is slightly longer than the maximum anticipated pulse duration. Alternatively, a variable impedance element such as FET 41 may be coupled to the RC circuit and operated by gating control 18 to vary the time constant of the RC circuit as a function of pulse width.

When bypass contactor 17 closes, the continuous conduction thus provided will persist far beyond the time constant of the above-described RC circuit. In order to prevent the production of a spurious fault signal, a biasing voltage is applied to terminal 21 simultaneously with the actuation of contactor 17. Transistor $Q_1$ is thereby kept in the conductive state, and prevented from producing an erroneous fault signal.

Should thyristor 16 have failed or, equivalently, if bypass contactor 17 has become stuck or the contacts welded shut, the conductivity thereof will be large when compared to the conductivity of the base-emitter circuit of transistor $Q_1$ and resistor 40 and will divert the current flowing from resistor 42 through diode 50. In this case transistor $Q_1$ will no longer be forward-biased and the voltage at the emitter thereof will decline, according to a time constant determined by the values of capacitor 51 and resistor 40, to a voltage level that which corresponds to a logic zero.

This activity will also occur should thyristor 16 fail to commutate or should the power contacts of contactor 17 remain closed after the removal of power from the coil of the contactor. While thyristor 16 conducts, current is drawn from resistor 42 through forward-biased diode 50, so that transistor $Q_1$ becomes nonconductive and capacitor 51 begins to discharge. After some period of time, corresponding to the longest anticipated on-time for thyristor 16, the voltage across capacitor 51 declines to a level representative of a logical 0. The logic 0 fault signal causes flip flop 22 to change state and output a logic 1 to inverting amplifier 56 for disabling transistor $Q_2$. Upon the disablement of transistor $Q_2$ current ceases to flow through the selected directional contactor coil and the appropriate directional contacts open to disconnect the switched elements from the main power source.

The presence of a logical 1 at the output terminal of disabling flip flop 22 causes NAND gate 52 to change state and apply a digital 1 to the upper input of NAND gate 53. However, due to the well-understood characteristics of such devices, the change in signal level at the upper input terminal of NAND gate 53 does not cause the gate to change state, and a logical 1 disable signal continues to be outputted by flip flop 22.

Signal outputted by flip flop 22 is also applied to the combination of resistor 60 and capacitor 61, which constitute a time delay circuit. After a predetermined period of time has elapsed, capacitor 61 charges to a voltage representative of a logical 1 which voltage is converted by means of inverter 62 to a logic 0 and applied to the set terminal S of flip flop 26. The logical 1 which arises upon capacitor 61 does not, however, affect the output signal of reset flip flop 26 since the signal ordinarily arising at the output terminal thereof is also a logical 1.

The logic 0 that is applied to the set terminal S of reset flip flop 26 is maintained there due to the presence of dropping resistor 32, the logic 0 signal also traversing diode 30 and appearing at set terminal S of disable flip flop 22. NAND gate 54 then changes state to apply a logic 1 to the upper input of lower NAND gate 55. The voltage appearing at the lower input of NAND gate 54 remains at logic 1 due to the voltage upon capacitor 65. This coincidence of logic 1's upon NAND gate 55 causes the gate to output a logic 0 which is in effect transmitted across diode 64 and resistor 63 to discharge capacitor 61. Inverter 62 then reapplies a logic 1 to the set terminal S of flip flop 26. However, since NAND gate 54 is already outputting a logic 1 the change in state of the signal at the upper input terminal thereof will not produce a change in the output signal. Reset flip flop 26 will thus continue to produce a logic 0 signal at the output thereof.

As set forth above, the logic 0 signal produced by inverting amplifier 62 appears at the set terminal S of disable flip flop 22. Since the lower input of NAND gate 52 is already receiving a logic 1, a change in state of the upper terminal thereof from a logic 1 to a logic 0 will cause the gate to apply a logic 1 to the upper input of NAND gate 53. If the impedance sensing portion of the fault detector circuit has by this time ceased to apply a logic 0 fault signal to the disable flip flop, and has reverted to a logic 1 signal indicating a clearing of the previously-detected fault, the coincidence of logical 1's at NAND gate 53 will cause the output signal thereof to change. A logical 0 will then be applied to inverter 56, causing transistor $Q_2$ to re-enter the conductive mode. Current again flows through the selected contactor coil, and the preselected directional contacts re-close.

It will thus be seen that the fault detector system herein described has the capability of resetting itself during a predetermined period, assuming that the detected fault has disappeared. In the event of a continuous fault such as welded contact tips or a permanently failed thyristor, the continuing production of a logic 0 fault signal by the impedance sensor stage will insure the continued nonconductivity of transistor $Q_2$ and the system will remain disabled.

Occasionally thyristor 16 may fail to commutate due to a transient voltage, or other unpredictable phenomena. Also, a slight delay may occur in the opening of contactor 17 due to an occasional sticking of the contacts. In the event of isolated occurrences of this nature the automatic resetting feature of the system will insure that the vehicle will remain in service without the necessity for a time-consuming manual resetting procedure. However, it is possible that a failure could occur which, though not procuring the continuous conduction of switching elements 16 or 17, in fact indicates a serious malfunction in the system. For instance, the failure of elements in the circuits which commutating thyristor 16 can produce sporadic commutation failures without causing the thyristor to conduct continuously. In this instance the try again aspect of the system comes into play. Assuming that one transient commutating failure has already occurred and reset flip flop 26 has changed state to produce a logic 0 output, it will now be impossible for the time delay capacitor 61 to accrue sufficient charge to cause inverter 62 to apply a logic 0 to the set terminals of flip flops 22 and 26 despite the presence of a logic 1 at the output terminal of disable flip flop 22. Current traversing resistor 60, instead of charging capacitor 61, will now flow through resistor 63 and diode 64.

It will now be seen that reset flip flop 26 acts to prevent a voltage representing a logic 1 from arising a second time at the intersection of resistor 60 and capacitor 61. Since the signal applied to the set terminal of flip flop 22 is now constrained to remain a logic 1, it is apparent that the flip flop can no longer change state even should the detected fault be cleared and the fault signal be abated. Flip flop 22 will thus continue to output a logical 1 signal and the system will remain disabled.

In order to return the system to its original status, it is only necessary to remove the biasing voltage from the system, advantageously by means of master switch $S_1$. Resistor 66 and capacitor 65 are chosen to produce a time delay of sufficient length to assure that a logical 1 signal is applied to clear terminal CL of flip flop 26 subsequent to the application of like signals to the set terminals of flip flops 22 and 26.

It will now be seen that the present invention provides a novel fault detection system with advantages heretofore unknown in the prior art. The disclosed system may be made as sensitive as necessary to detect transient commutation faults or sticking contacts, yet due to its try again or re-setting characteristic the system will not permanently "trip out" due to single isolated malfunction. Further, the system allows the detection of faults before power is applied to the motor, avoiding the possibility of a sudden lurch of a driven vehicle upon closure of the direction selector switch due to a short circuited thyristor or a welded bypass contact.

As will be evident from the foregoing description, certain aspects of the invention are not limited to the particular details of the examples illustrated, and it is therefore contemplated that other modifications or applications will occur to those as skilled in the art. It is accordingly intended that the appended claims shall cover all such modifications and applications as do not depart from the true spirit and scope of the invention.

What is claimed as new and desired to be secured by Letters Patent of the United States is:

1. Means for disabling an electrical drive system including an electric motor and power switching means for coupling the motor across a source of electrical energy, comprising:

sensing means coupled to the power switching means for producing a fault signal in response to the persistence of conductivity of said power switching means beyond a predetermined period of time;

disable means coupled to said sensing means and operable to interrupt the flow of power to the motor upon reception of a fault signal and to reapply power to the motor after the cessation of said fault signal and the reception of a reset signal;

reset means coupled to said disable means for outputting a reset signal in response to each of a predetermined number of operations of said disable means; and means for transmitting reset signals from said reset means to said disable means.

2. The invention defined in claim 1, wherein said reset means produces a reset signal only in response to the initial operation of said disable means.

3. The invention defined in claim 2, wherein said reset means comprises:

time delay means for outputting a reset signal during a predetermined time after the operation of said disable means; and first bistable means coupled to said time delay means for inhibiting said time delay means from producing subsequent reset signals.

4. The invention defined in claim 3, wherein said sensing means is coupled across said power switching means, said sensing means having an input impedance which is substantially higher than the impedance of an energized power switching means, but substantially lower than that of a deenergized power switching means.

5. The invention defined in claim 4, wherein said sensing means comprises a resistor-capacitor circuit whose time constant exceeds said predetermined period of time; said predetermined period of time being at least as long as a conductive interval of said power switching means.

6. The invention defined in claim 5, wherein said first bistable means is in a first state before the production of a first reset signal, and in a second state thereafter.

7. The invention defined in claim 6, wherein said disable means comprises a second bistable means.

8. The invention defined in claim 7, further including circuit means for coupling said first and said second bistable means to a source of power and for resetting said first and said second bistable means.

9. The invention defined in claim 8, wherein said circuit means comprises time delay means.

10. The invention defined in claim 9, further including variable impedance means coupled to said sensing means for varying said predetermined period of time.

11. A fault detector for disabling an electrical drive system including an electric motor and further including power switching means for repeatedly coupling the motor across a source of electrical energy, comprising:

sensing means for producing a fault signal in response to a persistence in conductivity of the power switching means beyond a first, predetermined period of time;

means for coupling said sensing means to said power switching means;

first bistable means coupled to said sensing means for producing a disable signal after the reception of said fault signal, and for maintaining said disable signal after termination of said fault signal until the reception thereby of a reset signal;

circuit means coupled to said first bistable means for disabling the electrical drive system in response to the production of a disable signal;

time delay means coupled to said first bistable means for outputting a reset signal a predetermined period of time after the production of a disable signal;

second bistable means coupled to said time delay means for inhibiting said time delay means from producing subsequent reset signals; and means for coupling said reset signal to said first bistable means for causing said first bistable means to cease producing a disable signal in the absence of a fault signal.

12. The invention defined in claim 11, wherein said sensing means comprises a transistor, and said means coupling said sensing means to said power switching device comprises a circuit coupling said sensing means and said power switching device to a common source of electric potential.

13. The invention defined in claim 12, wherein said second bistable means is in a first state prior to the production by said time delay means of an initial reset signal, and further including second circuit means for applying said reset signal to said second bistable means to cause said second bistable means to assume a second state.

14. The invention defined in claim 13, further including a reset circuit for coupling said first and said second bistable means to a source of electric potential, said reset circuit comprising second time delay means.

15. The invention defined in claim 14, wherein said sensing means further comprises third time delay means.

16. The invention defined in claim 15, further including variable impedance means coupled to said third time delay means for varying said first, predetermined period of time.

17. The invention defined in claim 16, further including inhibit circuit means coupled to said sensing means for selectively preventing the operation thereof during the prolonged conduction of the power switching means.

* * * * *